(12) United States Patent
Kawamura

(10) Patent No.: US 11,168,831 B2
(45) Date of Patent: Nov. 9, 2021

(54) ATTACHMENT MECHANISM FOR ELECTRONIC EQUIPMENT FOR ENGINE

(71) Applicant: TOYOTA JIDOSHA KABUSHIKI KAISHA, Toyota (JP)

(72) Inventor: Hiroshi Kawamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/929,049

(22) Filed: Sep. 25, 2018

(65) Prior Publication Data

US 2019/0145575 A1 May 16, 2019

(30) Foreign Application Priority Data

Nov. 15, 2017 (JP) ............................. JP2017-220304

(51) Int. Cl.
  *F16M 11/16* (2006.01)
  *F16M 11/10* (2006.01)
  *F02F 7/00* (2006.01)
  *F02M 35/10* (2006.01)
  *F02M 35/112* (2006.01)

(52) U.S. Cl.
  CPC ............. *F16M 11/16* (2013.01); *F02F 7/006* (2013.01); *F02M 35/10249* (2013.01); *F16M 11/10* (2013.01); *F02M 35/10373* (2013.01); *F02M 35/112* (2013.01)

(58) Field of Classification Search
  CPC ......... F16M 11/16; F16M 11/10; F02F 7/006; F02M 35/10249; F02M 35/10373; F02M 35/112

USPC ............................. 248/188.8, 560, 562, 638
See application file for complete search history.

(56) References Cited

U.S. PATENT DOCUMENTS

| 5,813,886 A | 9/1998 | Shomura |
| 6,170,516 B1 | 1/2001 | Sakata et al. |
| 7,488,227 B2* | 2/2009 | Fujima ................... F02M 37/24 440/77 |
| 2001/0047802 A1* | 12/2001 | Itoh ....................... F02M 35/112 123/585 |
| 2004/0007212 A1 | 1/2004 | Kato |
| 2011/0119915 A1* | 5/2011 | Sanbyakuda ............ F02F 7/006 29/888.011 |
| 2015/0082875 A1* | 3/2015 | Beyrich ............ F02M 35/10242 73/114.32 |

(Continued)

FOREIGN PATENT DOCUMENTS

| CN | 101066702 A | 11/2007 |
| CN | 203978605 U | 12/2014 |

(Continued)

*Primary Examiner* — Christopher Garft
(74) *Attorney, Agent, or Firm* — Oblon, McClelland, Maier & Neustadt, L.L.P.

(57) ABSTRACT

An attachment mechanism for electronic equipment for an engine includes a bracket configured to hold the electronic equipment and a plurality of support portions configured to elastically support the bracket with respect to a head cover of the engine. The support portions are disposed such that a maximum distance between two support portions of the support portions in a direction parallel to a shaft center of a crankshaft of the engine is longer than a maximum distance between the two support portions of the support portions in a direction perpendicular to the shaft center of the crankshaft of the engine.

2 Claims, 3 Drawing Sheets

(56) References Cited

U.S. PATENT DOCUMENTS

| | | | | |
|---|---|---|---|---|
| 2016/0195037 A1* | 7/2016 | Kira | .......................... | F02F 7/006 |
| | | | | 73/114.79 |
| 2016/0348621 A1* | 12/2016 | Kato | .......................... | B62M 7/02 |
| 2016/0348622 A1* | 12/2016 | Hotta | ...................... | F02D 9/109 |

FOREIGN PATENT DOCUMENTS

| | | |
|---|---|---|
| CN | 206111308 U | 4/2017 |
| CN | 206111343 U | 4/2017 |
| EP | 1 852 884 A1 | 11/2007 |
| EP | 2 693 023 A1 | 2/2014 |
| JP | 10-223111 A | 8/1998 |
| JP | 2006-220073 | 8/2006 |
| JP | 2010-261361 | 11/2010 |
| JP | 2012-062773 | 3/2012 |
| JP | 2013-124714 A | 6/2013 |
| WO | WO 2006/085640 A1 | 8/2006 |

* cited by examiner

ATTACHMENT MECHANISM FOR ELECTRONIC EQUIPMENT FOR ENGINE

INCORPORATION BY REFERENCE

The disclosure of Japanese Patent Application No. 2017-220304 filed on Nov. 15, 2017 including the specification, drawings and abstract is incorporated herein by reference in its entirety.

BACKGROUND

1. Technical Field

The present disclosure relates to an attachment mechanism for electronic equipment for an engine.

2. Description of Related Art

In some cases, electronic equipment such as a cam angle sensor is attached to a head cover covering a cylinder head of an engine (refer to, for example, Japanese Unexamined Patent Application Publication No. 2010-261361 (JP 2010-261361 A)).

SUMMARY

The electronic equipment may be adversely affected once vibration from the engine is transmitted to the electronic equipment. Desirable in this regard is damping of the vibration during the transmission of the vibration from the engine to the electronic equipment. In a case where the engine is mounted in a vehicle or the like, damping of the vibration as described above by means of a simple configuration is desired for surrounding spatial constraints. Based on the structure of the engine, a direction in which the vibration is likely to become significant is determined in advance.

The present disclosure provides an attachment mechanism for electronic equipment for an engine with which vibration from an engine can be effectively damped by means of a simple configuration.

An aspect of the present disclosure relates to an attachment mechanism for electronic equipment for an engine. The attachment mechanism includes a bracket configured to hold the electronic equipment and a plurality of support portions configured to elastically support the bracket with respect to a head cover covering a cylinder head of the engine (hereinafter, referred to as a "head cover"). The support portions are disposed such that a maximum distance between two support portions of the support portions in a direction parallel to a shaft center of a crankshaft of the engine is longer than a maximum distance between the two support portions of the support portions in a direction perpendicular to the shaft center of the crankshaft of the engine.

In the attachment mechanism according to the aspect of the present disclosure, the electronic equipment may include any one of a sensor, an electromagnetic valve, and a driver device driving a direct injection injector of the engine.

In the attachment mechanism according to the aspect of the present disclosure, the electronic equipment may be a pressure sensor connected to a pipe that communicates with either an intake system or an exhaust system of the engine. The bracket may be configured to hold the pressure sensor at a position vertically above a part where the pipe and the intake system or the exhaust system communicate with each other. The bracket may include a bottom wall portion attached to the head cover by the support portions and a side wall portion that extends vertically upward from the bottom wall portion and holds the pressure sensor.

In the attachment mechanism according to the aspect of the present disclosure, the bottom wall portion may include a notch portion configured to allow the pipe to pass through the notch portion between the support portions.

In the attachment mechanism according to the aspect of the present disclosure, the support portion may include an elastic body interposed between the head cover and the bottom wall portion.

According to the aspect of the present disclosure, an attachment mechanism for electronic equipment for an engine with which vibration from an engine can be effectively damped by means of a simple configuration can be provided.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1A:
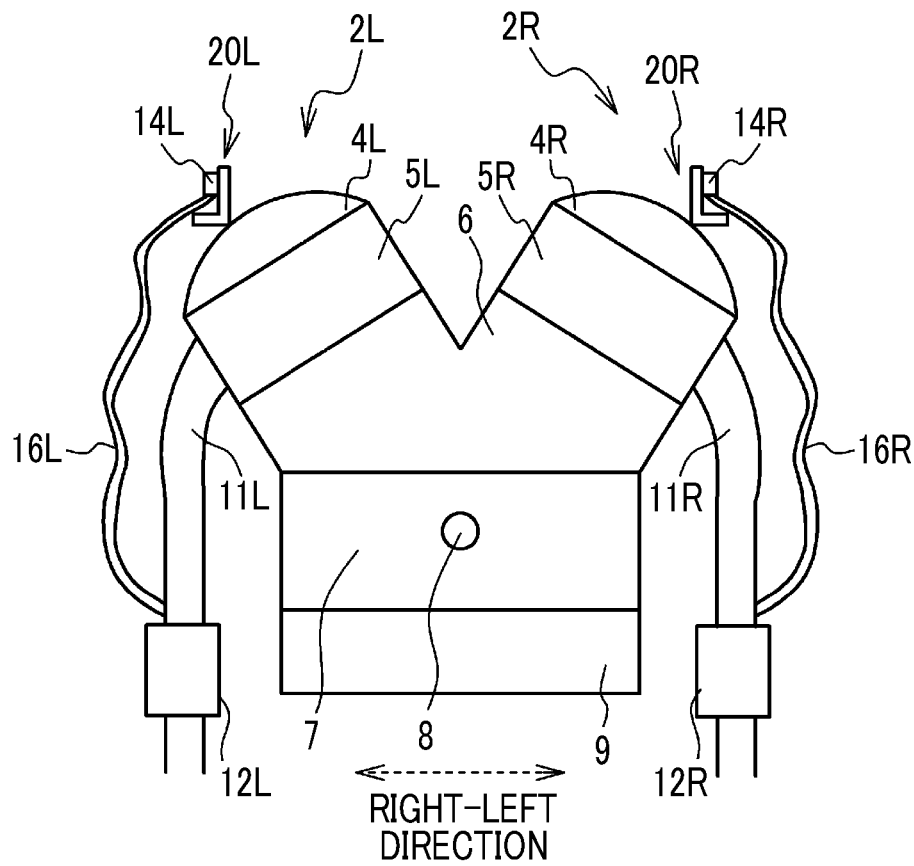
FIG. 1A is a schematic drawing in which an engine is seen from a direction along the shaft center of a crankshaft.
Figure 1B:
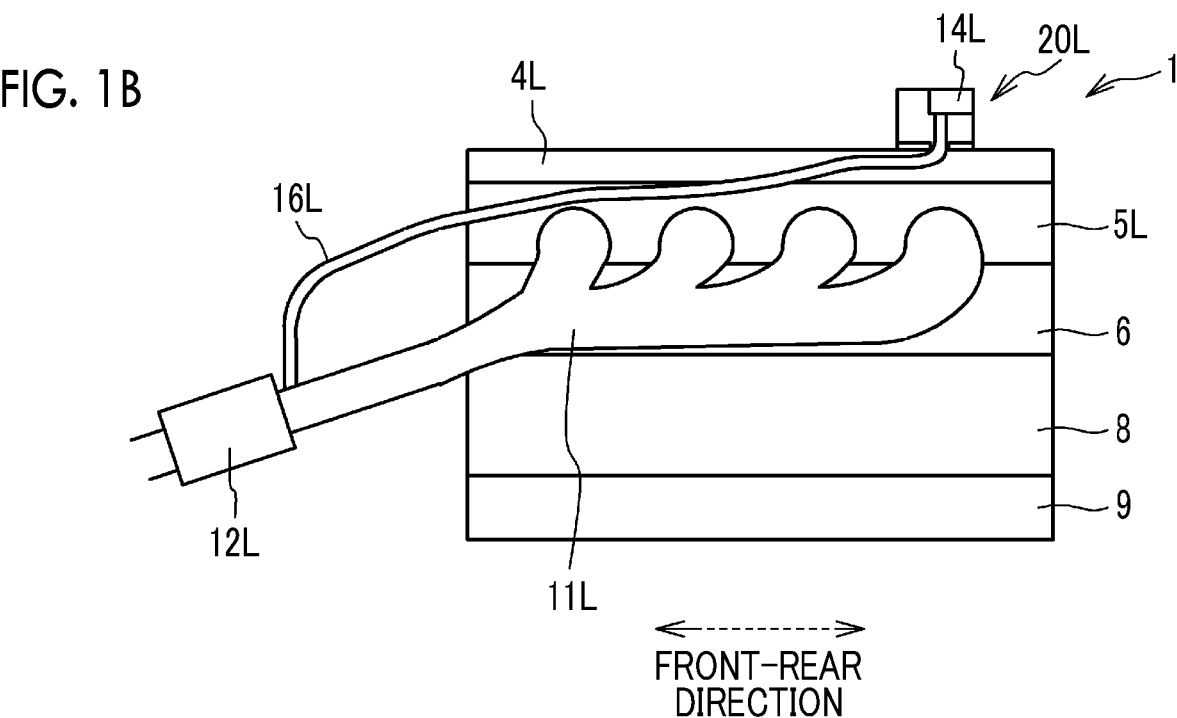
FIG. 1B is a schematic drawing in which the engine is seen from a direction orthogonal to the shaft center of the crankshaft.

FIG. 1A is a schematic drawing in which an engine 1 is seen from a direction along the shaft center of a crankshaft 8. FIG. 1B is a schematic drawing in which the engine 1 is seen from a direction orthogonal to the shaft center of the crankshaft 8. The right-left direction of the engine 1 is illustrated in FIG. 1A. The front-rear direction of the engine 1 is illustrated in FIG. 1B. The front-rear direction of the engine 1 is a direction perpendicular to the page of FIG. 1A. The right-left direction of the engine 1 is a direction perpendicular to the page of FIG. 1B. The front-rear direction of the engine 1 is a direction parallel to the shaft center of the crankshaft 8. The right-left direction of the engine 1 is a direction perpendicular to the shaft center of the crankshaft 8. The engine 1 is mounted in, for example, a vehicle.

The engine 1 is a V-type engine that has a pair of banks 2R, 2L protruding in a V-shape on a cylinder block 6. The banks 2R, 2L are provided with cylinder heads 5R, 5L installed on the upper end portion of the cylinder block 6 and head covers 4R, 4L respectively attached to the upper ends of the cylinder heads 5R, 5L, respectively. Four cylinders are disposed for each of the banks 2R, 2L in the cylinder block 6. A piston is disposed in each of the cylinders. Each of the pistons is connected to the crankshaft 8 so as to transmit power to the crankshaft 8. Furthermore, a crankcase 7 is attached to the lower side of the cylinder block 6. An oil pan 9 as an oil reservoir is arranged beneath the crankcase 7. Exhaust passages 11R, 11L are connected to the cylinder heads 5R, 5L, respectively. Particulate filters 12R, 12L are disposed on the exhaust passages 11R, 11L, respectively. Intake passages (not illustrated) are connected to the cylinder heads 5R, 5L, respectively.

The head covers 4R, 4L are provided with sensors 14R, 14L, respectively. Specifically, the sensors 14R, 14L are attached on the head covers 4R, 4L by attachment mechanisms 20R, 20L, respectively. The sensor 14L is connected to the upstream side of the particulate filter 12L via a pipe 16L. Likewise, the sensor 14R is connected to the upstream side of the particulate filter 12R via a pipe 16R. The sensors 14R, 14L are sensors detecting the pressures of the upstream sides of the particulate filters 12R, 12L, respectively. However, the present disclosure is not limited thereto, and the sensors 14R, 14L may detect the pressures of the downstream sides of the particulate filters 12R, 12L instead.

Figure 2A:
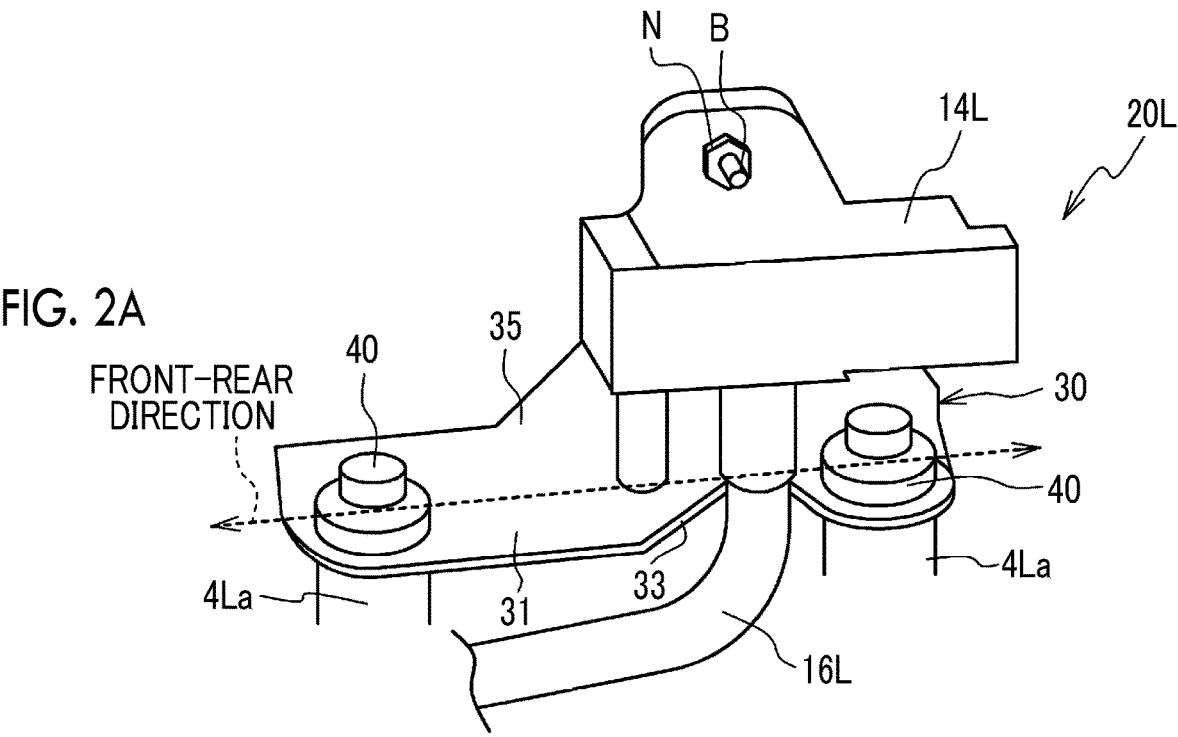
FIG. 2A is an explanatory diagram of an attachment mechanism.

The attachment mechanism 20L will be described in detail below. The attachment mechanism 20R has almost the same configuration as the attachment mechanism 20L, and thus description of the attachment mechanism 20R will be omitted. FIG. 2A is an explanatory diagram of the attachment mechanism 20L. The attachment mechanism 20L has a bracket 30 and support portions 40. The bracket 30 has a bottom wall portion 31 and a side wall portion 35 extending vertically upward from the bottom wall portion 31. The bottom wall portion 31 has a flat plate shape, and the front-rear direction of the engine 1 is the longitudinal direction of the bottom wall portion 31. In the head cover 4L, two projecting portions 4La protrude vertically upward. The bottom wall portion 31 is attached to the projecting portions 4La by the two support portions 40. The two support portions 40 and the two projecting portions 4La are apart from each other respectively in the front-rear direction of the engine 1. In the bottom wall portion 31, a notch portion 33 is formed between the two support portions 40, which will be described in detail later. The sensor 14L is fixed to the side wall portion 35 by a bolt B and a nut N.

Figure 2B:
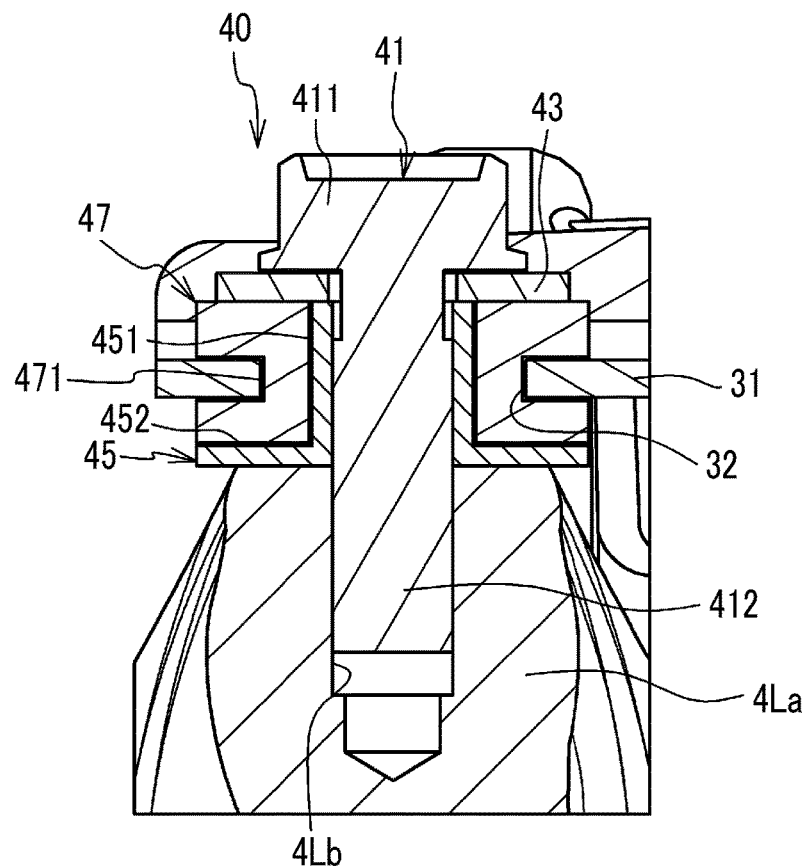
FIG. 2B is a sectional view of a support portion.

FIG. 2B is a sectional view of the support portion 40. The support portion 40 includes a bolt 41, a washer 43, a spacer 45, and a grommet 47. The bolt 41 has a head portion 411 and a shaft portion 412 that is smaller in diameter than the head portion 411, is long in the axial direction thereof, and has a screw groove formed in the outer periphery thereof. The head portion 411 is screwed into a screw hole 4Lb formed in the projecting portion 4La through a hole 32 formed in the bottom wall portion 31. The spacer 45 is made of metal and has a tubular portion 451 and a disk-shaped disk portion 452 radially expanding from the tubular portion 451. The shaft portion 412 of the bolt 41 penetrates the tubular portion 451 of the spacer 45. The disk portion 452 is in contact with the upper end surface of the projecting portion 4La. The washer 43 is made of metal and is positioned between the grommet 47 and the head portion 411 of the bolt 41. In other words, the grommet 47 is sandwiched between the washer 43 and the disk portion 452 of the spacer 45. The grommet 47 is made of rubber and has a substantially annular shape. In the circumferential direction of the grommet 47, a recessed portion 471 is formed in the circumferential direction. The grommet 47 is fitted to the outside of the tubular portion 451 of the spacer 45, the recessed portion 471 of the grommet 47 is fitted with the hole 32 of the bottom wall portion 31, and the grommet 47 is sandwiched between the washer 43 and the disk portion 452 of the spacer 45 as described above.

In the above-described manner, the bottom wall portion 31 of the bracket 30 is fixed to the screw hole 4Lb of the projecting portion 4La via the grommet 47. In other words, the support portion 40 elastically supports the bracket 30 with respect to the head cover 4L of the engine. Accordingly, vibration of the engine 1 is damped by the grommet 47 and transmission of significant vibration to the bracket 30 and the sensor 14L held by the bracket 30 is suppressed.

Figure 3:
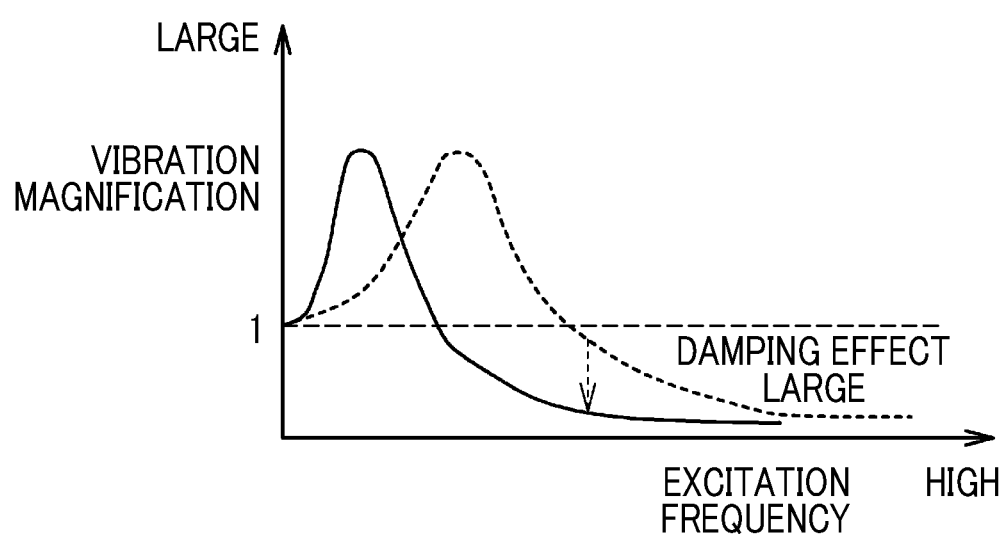
FIG. 3 is a graph illustrating an excitation frequency-vibration magnification relationship in a case where vibration has been applied to an object supported by a spring.

The two support portions 40 are disposed along the front-rear direction of the engine 1 as illustrated in FIG. 2A, and thus vibration of the bracket 30 in the right-left direction of the engine 1 can be effectively damped with respect to vibration of the bracket 30 in the front-rear direction of the engine 1. The reason will be described below. FIG. 3 is a graph illustrating an excitation frequency-vibration magnification relationship in a case where vibration has been applied to an object supported by a spring. The horizontal axis represents an excitation frequency, and the vertical axis represents a vibration magnification. The dotted line represents a case where a spring constant K is large, and the solid line represents a case where the spring constant K is small. It is known that a resonance peak frequency decreases as the spring constant K decreases. Accordingly, the region of the excitation frequency with a vibration magnification of 1 or less increases as the spring constant K decreases. In other words, it is shown that vibration is effectively damped when the spring constant K is small.

In this example, the two support portions 40 are disposed along the front-rear direction of the engine 1 as described above. Accordingly, it can be regarded that the bracket 30 is supported by merely one of the support portions 40 with respect to vibration of the engine 1 in the right-left direction whereas the bracket 30 is supported by the two support portions 40 with respect to vibration of the engine 1 in the front-rear direction. Therefore, it can be regarded that the spring constant of a spring supporting the bracket 30 with respect to vibration of the engine 1 in the right-left direction is smaller than the spring constant of a spring supporting the bracket 30 with respect to vibration of the engine 1 in the front-rear direction. As a result, vibration of the bracket 30 in the right-left direction of the engine 1 can be effectively damped with respect to the front-rear direction of the engine 1.

In the V-type engine 1, the banks 2R, 2L resonate in the arc direction about the crankshaft 8 in some cases due to reciprocation of the pistons respectively disposed in the banks 2R, 2L. As a result, vibration of the engine 1 in the right-left direction exceeds vibration of the engine 1 in the front-rear direction. Accordingly, vibration of the bracket 30 in the right-left direction of the engine 1 can be effectively damped by means of a simple configuration in which the two support portions 40 are disposed along the front-rear direction of the engine 1 as described above. As a result, adverse effects on the sensor 14L held by the bracket 30 also can be further suppressed. Since the attachment mechanism 20L has a simple configuration as described above, the attachment mechanism 20L can be adopted even in a case where the space surrounding the engine 1 is narrow. Although the engine 1 vibrates also in the up-down direction due to the reciprocation of the pistons in the banks 2R, 2L, the vibration in the up-down direction also can be damped by the grommets 47 of the two support portions 40.

As illustrated in FIGS. 1A and 1B, the pipe 16L is connected to the sensor 14L and the pipe 16L communicates with the exhaust passage 11L. Exhaust gas flowing through the exhaust passage 11L may cause condensed water to be generated in the pipe 16L. Here, the sensor 14L is attached to the head cover 4L by the attachment mechanism 20L, and thus is positioned vertically above the part where the pipe 16L and the exhaust passage 11L are interconnected. The side wall portion 35 of the bracket 30 is positioned vertically above the bottom wall portion 31 and holds the sensor 14L, and thus the sensor 14L is held by the bracket 30 on a vertically higher side. As a result, the part of the pipe 16L that is connected to the sensor 14L is positioned on a vertically higher side, and discharge of the condensed water generated in the pipe 16L into the exhaust passage 11L is promoted by gravity. As a result, the impact of condensed water accumulation in the pipe 16L on the detection accuracy of the sensor 14L can be further suppressed.

The end portion of the pipe 16L on the sensor 14L side passes through the notch portion 33 formed in the bottom wall portion 31 as illustrated in FIG. 2A, and interference with the bottom wall portion 31 is suppressed. As a result, the end portion of the pipe 16L on the sensor 14L side can be routed vertically downward, and the degree of freedom of routing of the pipe 16L is improved.

Although an example of the present disclosure has been described in detail above, the present disclosure is not limited to the above-described specific example and can be modified and changed in various forms within the scope of the present disclosure set forth in the claims.

Although the two support portions 40 are arranged along the front-rear direction of the engine 1 as described above, this does not mean that the line segment interconnecting the two support portions 40 is needed to be parallel to the front-rear direction of the engine 1. Alternatively, the line segment may be inclined to some extent with respect to the front-rear direction. In other words, the distance between the two adjacent support portions 40 in the front-rear direction of the engine 1 may be longer than the distance between the two adjacent support portions 40 in the right-left direction of the engine 1. Although the two support portions 40 are disposed along the front-rear direction of the engine 1 in the above-described example, three or more support portions 40 may be disposed along the front-rear direction of the engine 1 instead. A coil spring, an annular leaf spring, or the like may be adopted instead of the grommet 47.

Although a V-type engine has been exemplified in this example, the present disclosure is also applicable to an in-line engine. Also in a case where the present disclosure is applied to an in-line engine, vibration of the engine in the right-left direction exceeds vibration of the engine in the front-rear direction as a result of rotation of the crankshaft 8.

In the above-described example, a sensor detecting the internal pressure of an exhaust system has been described as an example of electronic equipment. However, an applicable embodiment of the present disclosure is not limited thereto. For example, the electronic equipment may also be a pressure sensor connected to a pipe communicating with either the intake system or the exhaust system of an engine. The electronic equipment may also be an electromagnetic valve such as a vacuum switching valve for purging or a driver device driving a direct injection injector of an engine. This is because any of the electronic equipment can be installed near the head cover of the engine and may be affected by transmission of significant vibration.

What is claimed is:

1. An electronic equipment attachment system comprising:
    electronic equipment;
    an engine; and
    an attachment mechanism comprising:
        a bracket holding the electronic equipment; and
        first and second support portions elastically supporting the bracket with respect to a head cover of the engine, the first and second support portions being disposed such that a maximum distance between the first and second support portions in a first direction extending parallel to a shaft axis of a crankshaft of the engine is longer than a maximum distance between the first and second support portions in a second direction extending perpendicular to the shaft axis of the crankshaft of the engine,
    wherein the bracket is supported only by the first and second support portions,
    wherein the bracket includes a bottom wall portion attached to the head cover by the first and second support portions and a side wall portion that extends vertically upward from the bottom wall portion and holds the electronic equipment,
    wherein the head cover includes first and second projecting portions which protrude vertically upward, and the bottom wall portion is attached to the first and second projecting portions by the first and second support portions,
    wherein the first support portion includes a first bolt passing through the bottom wall portion and the first projecting portion and a first elastic body interposed between the head cover and the bottom wall portion, and the second support portion includes a second bolt passing through the bottom wall portion and the second projecting portion and a second elastic body interposed between the head cover and the bottom wall portion,
    wherein the electronic equipment is a pressure sensor connected to a pipe that communicates with either an intake system or an exhaust system of the engine,
    wherein the bracket holds the pressure sensor at a position vertically above a part where the pipe and the intake system or the exhaust system communicate with each other,
    wherein the bottom wall portion includes a notch portion allowing the pipe to pass through the notch portion between the first and second support portions, and
    wherein the pressure sensor is mounted on the head cover, and an upper end of the pipe is connected to the pressure sensor.

2. The attachment system according to claim 1, wherein the bottom wall portion is planar.

* * * * *